(12) United States Patent
Won et al.

(10) Patent No.: US 7,107,178 B2
(45) Date of Patent: Sep. 12, 2006

(54) TEMPERATURE SENSING CIRCUIT FOR USE IN SEMICONDUCTOR INTEGRATED CIRCUIT

(75) Inventors: Myung-Gyoo Won, Suwon-si (KR); Jae-Hoon Kim, Suwon-si (KR); Jong-Wook Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/942,776

(22) Filed: Sep. 17, 2004

(65) Prior Publication Data

US 2005/0074051 A1 Apr. 7, 2005

(30) Foreign Application Priority Data

Oct. 6, 2003 (KR) .................... 10-2003-0069069

(51) Int. Cl.
*G01F 15/00* (2006.01)
*G01K 7/00* (2006.01)

(52) U.S. Cl. ................. 702/130; 327/513; 365/189.09; 377/25; 702/104

(58) Field of Classification Search ................. 702/99, 702/104, 130, 131, 136; 327/513, 538, 539, 327/543; 374/133, 178, 183; 365/211, 212, 365/189.09; 377/25
See application file for complete search history.

(56) References Cited

U.S. PATENT DOCUMENTS

| 4,014,238 | A | | 3/1977 | Southard |
| 4,395,139 | A | | 7/1983 | Namiki et al. |
| 4,465,379 | A | | 8/1984 | Misawa et al. ............. 368/202 |
| 5,025,248 | A | | 6/1991 | Bergeron |
| 5,375,093 | A | | 12/1994 | Hirano |
| 5,638,418 | A | * | 6/1997 | Douglass et al. ............. 377/25 |
| 5,739,593 | A | | 4/1998 | Hayama |
| 5,795,069 | A | | 8/1998 | Mattes et al. ............... 374/183 |
| 5,835,553 | A | * | 11/1998 | Suzuki ........................ 377/25 |
| 5,875,142 | A | | 2/1999 | Chevallier .................. 365/212 |
| 5,961,215 | A | | 10/1999 | Lee et al. .................... 374/178 |
| 6,157,244 | A | | 12/2000 | Lee et al. .................... 327/539 |
| 6,281,760 | B1 | | 8/2001 | Koelling et al. |
| 6,299,347 | B1 | | 10/2001 | Pompei |
| 6,316,988 | B1 | | 11/2001 | Forhand et al. |
| 6,316,991 | B1 | | 11/2001 | Muyshondt et al. |
| 6,320,809 | B1 | | 11/2001 | Raad |
| 6,348,832 | B1 | | 2/2002 | Chih .......................... 327/538 |
| 6,489,831 | B1 | | 12/2002 | Matranga et al. ........... 327/512 |
| 6,504,420 | B1 | * | 1/2003 | Vorenkamp et al. ........ 327/513 |
| 6,591,210 | B1 | | 7/2003 | Lorenz |
| 6,643,193 | B1 | * | 11/2003 | Yamaki et al. ......... 365/189.09 |
| 6,667,925 | B1 | | 12/2003 | Kobayashi et al. ......... 365/211 |

FOREIGN PATENT DOCUMENTS

| JP | 2003297929 | 10/2003 |
| KR | 1020030056382 A | 7/2003 |
| KR | 2004-0013885 | 3/2004 |

* cited by examiner

*Primary Examiner*—Bryan Bui
*Assistant Examiner*—John H. Le
(74) *Attorney, Agent, or Firm*—Volentine Francos & Whitt (57) ABSTRACT

A temperature sensing circuit has numerous trip points in conformity with a temperature change without adding decrease resistance branches, so as to obtain a fine control based on the temperature change. Accordingly, when employed in a semiconductor memory device, the temperature sensing circuit substantially reduces the consumption of refresh electrical power in a stand-by state without decreasing the reliability of the semiconductor memory device.

17 Claims, 11 Drawing Sheets

TEMPERATURE SENSING CIRCUIT FOR USE IN SEMICONDUCTOR INTEGRATED CIRCUIT

CROSS REFERENCES TO RELATED APPLICATIONS

This application claims priority under 35 U.S.C. § 119 from Korean Patent Application 2003-69069, filed on Oct. 6, 2003, the contents of which are hereby incorporated by reference in their entirety for all purposes as if fully set forth herein.

BACKGROUND AND SUMMARY

1. Technical Field

The present invention relates to a temperature sensor. More particularly, the present invention relates to a temperature sensor circuit for use in a semiconductor integrated circuit.

2. Description of the Related Art

Various semiconductor devices embodied with integrated circuit chips, such as CPUs, memories and gate arrays etc., are incorporated in various electrical products such as portable personal computers, Personal Digital Assistants (PDAs), servers or workstations. While these electrical products have a sleep mode for saving electrical power, most circuit components become a turn-off state. However, a Dynamic Random Access Memory (DRAM) as a volatile memory should refresh data of memory cells by itself in order to continuously preserve the data stored in the memory cells. The self-refresh operation requires self-refresh electrical power in the DRAM. Meanwhile, however, reducing the electrical power in a battery operated system requiring a lower electrical power is very important and critical.

One technique to reduce the electrical power needed for the self-refresh is to change the refresh cycle in conformity with the temperature. The data preservation time in a DRAM becomes longer at reduced temperatures. Thus, the temperature range is divided into several regions, and the frequency of the refresh clock is lowered relatively at a low temperature region, to thus reduce the consumption of electrical power. Herewith, in order to obtain an internal temperature of a DRAM, a built-in temperature sensor having low electrical power consumption is required.

Figure 1:
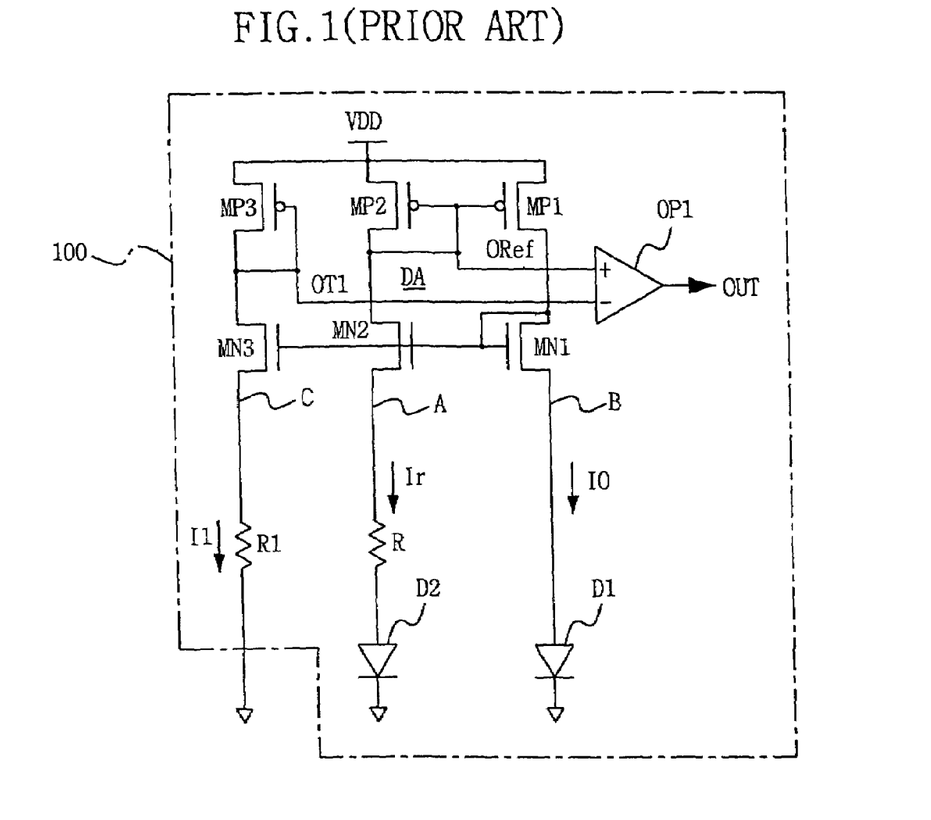
FIG. 1 is a circuit diagram of a temperature sensor using a general bandgap reference circuit.

FIG. 1 illustrates a circuit configuration of a conventional temperature sensor using a band-gap reference circuit. Referring to FIG. 1, a temperature sensor 100 comprises a current mirror type differential amplifier DA, a decrease resistance (R1) branch in which the current decreases with an increase in temperature, an increase resistance (R) branch in which the current increases with an increase in temperature, and a comparator OP1 for outputting as a comparison output signal OUT a comparison result between a reference temperature ORef and a sense temperature OT1. P-type MOS transistors MP1, MP2, MP3 have a size ratio of 1:1:1, and N-type MOS transistors MN1, MN2, MN3 also have a size ratio of 1:1:1, wherein the size indicates the product of the channel length L and the gate width W.

The temperature sensor shown in FIG. 1 operates as follows. A current of IO:Ir=1:1 flows by a current mirror operation of the PMOS transistors MP1,MP2 and the NMOS transistors MN1,MN2 equipped within the differential amplifier DA, and the voltages at the branches A, B have the same level.

A current equation for a turn-on section in a general junction diode becomes $I=Is\{e^{(VD/VT)}-1\} \approx Is*e^{(VD/VT)}$, wherein Is indicates a reverse saturation current, VD is a diode voltage, and VT is kT/q and indicates a thermal voltage.

Voltages appearing in the branches A, B are the same as each other, thus VA=VB=VD1=VD2+Ir*R. Also, $IO=Is_1*e^{(VD1/VT)} \rightarrow VD1=VT*\ln(IO/Is_1)$.

Further, since $Ir=Is_2*e^{(VD2/VT)} \rightarrow VD2=VT*\ln(Ir/Is_2)$ $=VT*\ln(IO/IS_2)=VT*\ln(IO/M*Is_1)$, where M is a natural number indicating a size ratio of the diodes D2 and D1, i.e., M=(size of D2)/(size of D1).

Therefore, VD1=VD2+Ir*R becomes $VT*\ln(IO/Is_1)$ $=VT*\ln(IO/M*Is_1)+Ir*R$.

That is, Ir=VT*ln(M)/R. Accordingly, a current proportional to the temperature flows at the branch A. In addition, when a similar amount of current flows in I1 and IO, a voltage VC of branch C is about equal to a value of VB, and therefore VC=VD1=VT*ln(IO/Is).

In general, the reverse saturation current Is increases greatly in comparison with VT, according to the increase of temperature, thus a diode voltage has a characteristic of a reduction based on a temperature. In other words, since VC is reduced by the temperature increase, I1 is reduced by increasing temperature.

Figure 2:
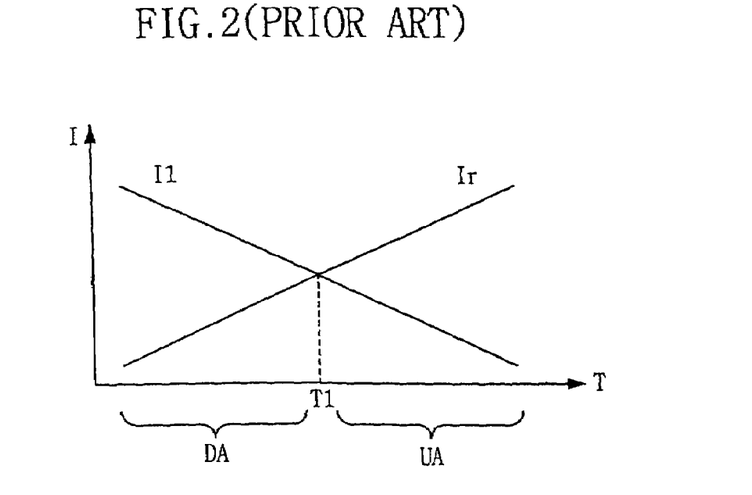
FIG. 2 is a graph illustrating a temperature to current change appearing in resistance branches by an operation of the temperature sensor referred to FIG. 1.
Figure 3:
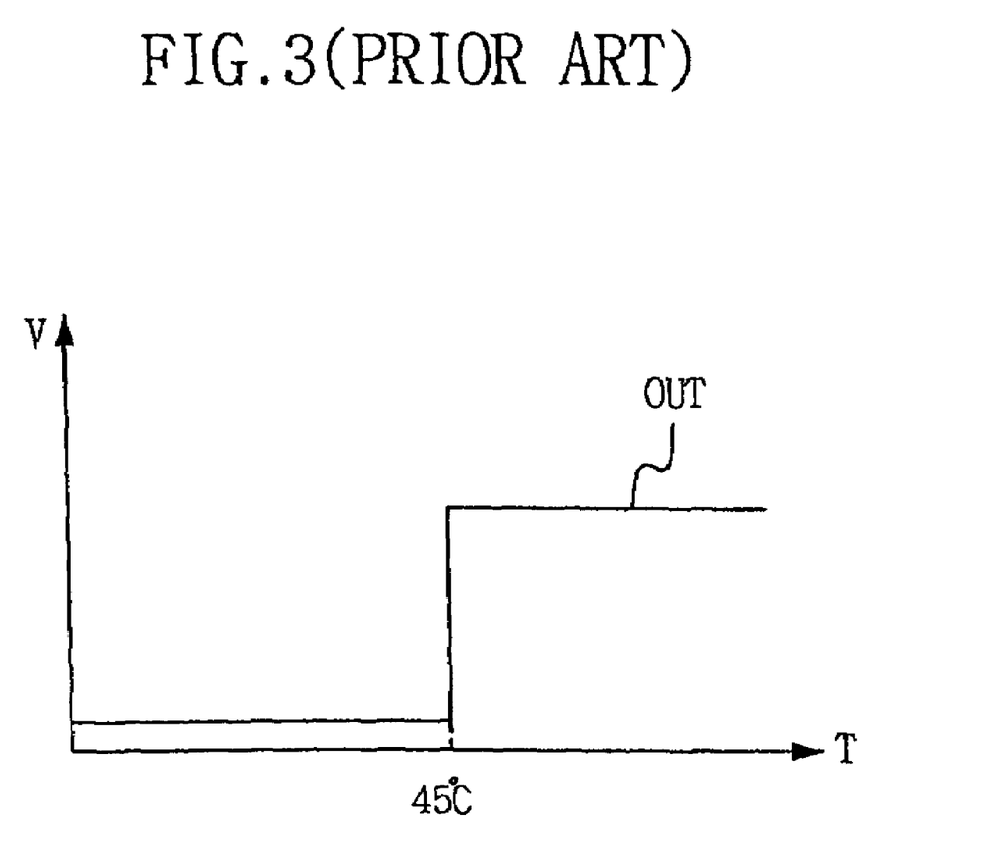
FIG. 3 illustrates an output waveform of a comparator based on an operation of the temperature sensor referred to FIG. 1.

Hence, a resistance value of the resistor R1 of the decrease resistance (R1) branch is tuned so that a value of Ir and I1 cross at a specific temperature T1 as shown in FIG. 2. The temperature sensor 100 of FIG. 1 functions as a temperature sensor designed to have a trip point at the specific temperature T1. FIG. 2 is a graph showing a temperature-to-current change that appears in the resistance branches by operation of the temperature sensor of FIG. 1. In FIG. 2, if the specific temperature T1 is, e.g., 45° C., an output signal OUT outputted from the comparator OP1 within the temperature sensor 100 is provided as a waveform OUT as shown in FIG. 3. FIG. 3 illustrates an output waveform of the comparator through an operation of the temperature sensor of FIG. 1.

In applying a general built-in temperature sensor shown in FIG. 1 to a semiconductor memory device such as a DRAM, a temperature tuning operation is performed on the temperature sensor. Accordingly, devices constituting the temperature sensor have a characteristic sensitive to a manufacturing process change so as to change the trip point. The temperature tuning process wherein the changed trip point is matched to a designed temperature point, is generally performed for every separate chip at a wafer level; and a process of detecting a shift temperature shifted by the manufacturing process change, and an operation of performing a temperature trimming through a cutting of device such as a fuse etc., are executed sequentially.

Herewith, the temperature sensor of FIG. 1 has only one decrease resistance branch, thus there is only a trip point for one specific temperature. Thus, refresh cycles controlled by a temperature provided before/after a specific temperature have a remarked difference. For example, if the specific temperature is 45° C., the refresh cycle is relatively lengthened from 1° C. to 44° C., but is relatively shortened at 46° C. that is a temperature greater than the trip point.

Thus, in order to mitigate the remarked difference of the refresh cycles at temperatures greater than, and less than, the specific temperature, a separate decrease resistance branch is connected in parallel with the decrease resistance branch of the temperature sensor in the prior art. For instance, in order that the temperature sensor has two trip points, another branch should be arranged in parallel with the branch C of FIG. 1, and the branch should be connected to a resistance.

Hence, resistance branches corresponding to the necessary number of trip points are installed in order to have more than two trip points.

However, in a general control of the refresh cycle, the temperature sensor having two trip points is used, which is why there are problems such an increased time to perform a resistance trimming operation based on a process change, and an extension of the area occupied by the temperature sensor, in case the temperature sensor is provided with more than two branches.

That is, there was the difficulty to have numerous trip points in the conventional temperature sensor. In employing the conventional temperature sensor in the semiconductor memory device, a refresh cycle of the semiconductor memory is difficult to be appropriately controlled by a temperature change without a rapid change of a refresh cycle control, thus reliability of a semiconductor device may be dropped.

Hence, it would be desirable to provide an improved temperature sensor and temperature sensing circuit capable of having numerous trip points even without an extension in the number of decrease resistance branches in the temperature sensor.

Some example embodiments of the present invention provide a built-in temperature sensor and a temperature sensing circuit having the temperature sensor, which is adaptable to the interior of a semiconductor integrated circuit and has numerous trip points without extending the number decrease resistance branches in the temperature sensor.

Some example embodiments of the present invention provide an on-chip temperature sensing circuit for adequately controlling a refresh cycle in conformity with a temperature change in equipping the temperature sensing circuit with the semiconductor memory device.

Some example embodiments of the present invention provide a built-in temperature sensing circuit capable of substantially reducing a self-refresh electrical power consumption of a semiconductor memory device in conformity with a temperature change.

In one aspect of the invention, a temperature sensing circuit comprises sampling signal generator adapted to generate a reset signal and sampling signals; a temperature sensor, comprising, a decrease resistance branch in which current decreases in response to an increase in temperature, and a current mirror differential amplifier connected to the decrease resistance branch, wherein said temperature sensor is adapted to output temperature sensing data generated in response to the sampling signals; and a counting output part adapted to count and latch the temperature sensing data from the temperature sensor, and adapted to output counting data, said counting output part being reset by the reset signal of the sampling signal generator.

Beneficially, the differential amplifier includes an increase resistance terminal and a decrease resistance terminal, and the temperature sensor further comprises an increase resistance branch, which is connected between the increase resistance terminal of the differential amplifier and a lower supply voltage, in which current increases in response to an increase in temperature; a first resistance string having a plurality of resistances connected in series with the decrease resistance branch, between the decrease resistance terminal and the lower supply voltage; a short-circuit switching part adapted to selectively short-out one or more of the plurality of resistances in response to the sampling signals; and a comparator adapted to compare a reference temperature output appearing at the increase resistance with a sensing temperature output appearing at the decrease resistance terminal, and outputting the comparison result as the temperature sensing data.

Beneficially, the sampling signal generator comprises a plurality of unit sampling signal generating parts connected in cascade, each said unit sampling signal generating part being adapted to apply a NOR operation to an applied input signal and an inverted and delayed signal of the input signal, and outputting a result of the NOR operation as a corresponding one of the sampling signals, wherein a first unit sampling signal generating part outputs a first sampling signal, a second unit sampling signal generating part outputs a second sampling signal, the last unit sampling signal generating part outputs the reset signal, and a unit sampling signal generating part immediately preceding the last unit sampling signal generating part outputs a pass gate control signal.

Also beneficially, the counting output part comprises a plurality of flipflops connected in cascade, each flip-flop having an input terminal, an output terminal, and a clock terminal, wherein the input terminal of each flipflop is connected to a fixed voltage level, wherein the temperature sensing data is received at the clock terminal of a first-stage flipflop, and wherein an output signal appearing at the output terminal of each flip-flop is connected with the clock terminal of a subsequent flipflop; a pass gate adapted to transmit the output signals of the plurality of flipflops in response to the pass gate control signal; and a latch adapted to latch the outputs of the plurality of flipflops transmitted by the pass gate.

Beneficially, the temperature sensing circuit also includes an oscillator outputting an oscillation signal having an oscillating period controlled in response to the counting data output by the counting output part.

In one embodiment, the oscillator comprises an inverter chain having an odd number of inverters; a capacitor connected between an output terminal of the inverter chain and a lower supply voltage; a plurality of resistances cascade-connected between inverters of the inverter chain; and switching transistors connected in parallel across resistances, said switching transistors being adapted to selectively short-out the resistances in response to the counting data.

Also beneficially, the temperature sensing circuit also includes a refresh counter refresh counter comprising a plurality of flipflops connected in cascade, each said flipflop having an input terminal, an output terminal, and a clock terminal, wherein the input terminal of each flipflop is connected to a fixed voltage level, wherein the oscillation signal is received at the clock terminal of a first-stage flipflop, and wherein an output signal appearing at the output terminal of each flip-flop is connected with the clock terminal of a subsequent flip-flop.

Also beneficially, the temperature sensing circuit also includes a resistance value trimming part connected to the first resistance string and adapted to individually vary resistance values for respective resistances of the first resistance string part.

Beneficially, the temperature sensor can further include a second resistance string having a plurality of resistances connected in series with the decrease resistance branch, between the decrease resistance terminal and the lower supply voltage; and a short-circuit release switching part adapted to selectively disconnect a short across one or more of the plurality of resistances of the second resistance string in response to the sampling signals.

In another aspect of the invention, a temperature sensor, comprises a decrease resistance branch having a first current that decreases in response to an increase in temperature, the decrease resistance branch comprising, a plurality of resistors connected in series, and means for selectively shorting-out one or more of the plurality of resistors to adjust a total series resistance in the decrease resistance branch; an increase resistance branch having a second current that increases in response to an increase in temperature; a current mirror differential amplifier having an increase resistance terminal connected to the increase resistance branch, a decrease resistance terminal connected to the decrease resistance branch, and adapted to output a first voltage representing a reference temperature corresponding to the first current and a second voltage representing a sense temperature corresponding to the second current; and a comparator adapted to compare the first voltage and the second voltage and to output an output signal having a first logic level when the first voltage is greater than the second voltage, and a second logic level when the first voltage is less than the second voltage.

Beneficially, the means for selectively shorting-out one or more of the plurality of resistors comprises a plurality of switches connected in parallel across resistances, said switches being adapted to selectively short-out the resistances in response to control signals.

Beneficially, the decrease resistance branch further comprises a resistance value trimming part connected across the plurality of resistances and adapted to individually vary resistance values for respective resistances.

Beneficially, the resistance value trimming part comprises a plurality of fuses.

Beneficially, the comparator has an enable input and outputs the output signal at a fixed logic level in response to the enable signal being inactive, regardless of the first and second voltages Accordingly, numerous trip points can be provided by a temperature change without extending the number of decrease resistance branches, that is, a required fine control can be performed in conformity with the temperature change.

BRIEF DESCRIPTION OF THE DRAWINGS

The present invention will become more fully understood from the detailed description given below and the accompanying drawings, which are given by way of illustration only and thus are not limitative of the present invention, and wherein.

DETAILED DESCRIPTION

Hereinafter, example embodiments of the present invention will be described in detail with reference to FIGS. 4 to 14 in which like components having like functions have been provided with like reference symbols and numerals.

It will be understood by those skilled in the art that the present invention can be embodied by numerous different types and is not limited to the following described embodiments. The following various embodiments are examples in nature.

Figure 4:
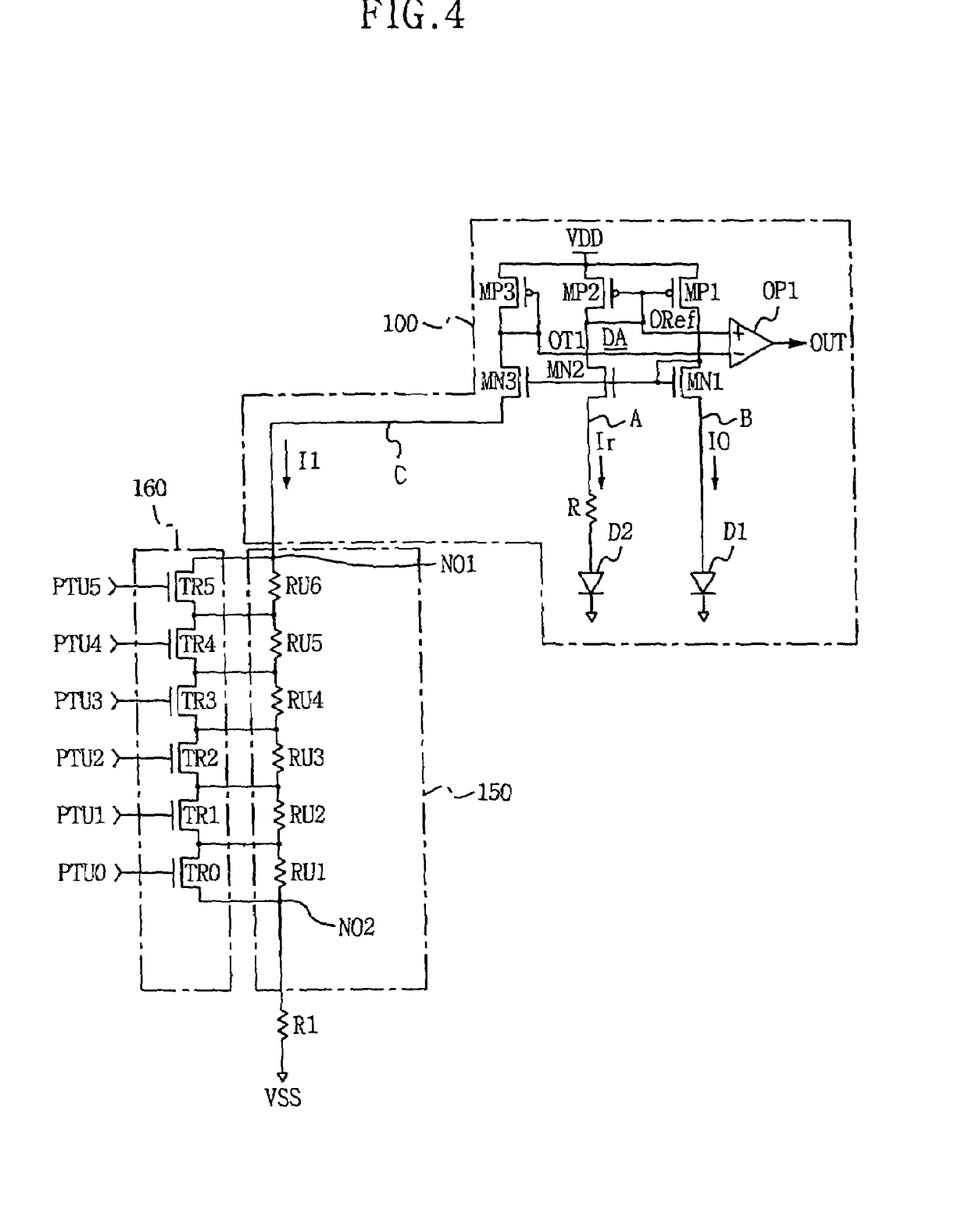
FIG. 4 is a circuit diagram of a temperature sensor according to one or more aspects of the present invention.

FIG. 4 shows a circuit diagram of a temperature sensor according to an exemplary embodiment. Referring to FIG. 4, there is shown a structure wherein a first resistance string part 150 and a short-circuit switching part 160 are connected to a decrease resistance branch C of a temperature sensor 100 such as that shown in FIG. 1.

The temperature sensor of FIG. 4 includes a differential amplifier DA of a current mirror type, a decrease resistance branch C, which is connected between a decrease resistance terminal NO1 of the differential amplifier DA and a ground VSS and in which a current is reduced by an increase of temperature, and an increase resistance branch A which is connected between an increase resistance terminal of the differential amplifier DA and the ground and in which a current increases with an increase in temperature. The temperature sensor also includes: a first resistance string part 150 having a plurality of resistances RU1–RU6 connected in series between the decrease resistance terminal NO1 and a resistance node NO2 of the decrease resistance branch C; a short-circuit switching part 160 for shorting the plurality of resistances RU1–RU6 individually and selectively in response to the sampling signals PTU0–PTU5; and a comparator OP1 for comparing a reference temperature output Oref, appearing in the increase resistance terminal, with a sensing temperature output OT1, appearing in the decrease resistance terminal NO1, and for outputting the comparison result OUT.

Junction diodes D2, D1 individually connected to the branches A, B of the differential amplifier DA have the same size as one another, and the P-type MOS transistors MP1, MP2,MP3 have a size ratio of 1:1:1. Furthermore, the N-type MOS transistors MN1,MN2,MN3 also determined as 1:1:1. The plurality of resistances RU1–RU6 have respectively different resistance values in the example embodiment of the invention. Further, the resistance RU1 among the resistances RU1–RU6 has a lowest resistance value and the resistance RU6 has a largest resistance value. Thus, the resistance values of the plurality of resistances RU1–RU6 are determined under a condition of RU1<RU2<RU3<RU4<RU5<RU6.

In the meantime, the short-circuit switching part 160 is composed of a plurality of N-type MOS transistors TR0–TR5, and is turned on when a corresponding sampling signal among the sampling signals PTU0–PTU5 is changed to a high state. Then, a corresponding resistance among the resistances RU1–RU6 is shorted operationally. That is, the plurality of N-type MOS transistors TR0–TR5 have a normally turned-off state so as to substantially reduce their electrical power consumption.

In the temperature sensor of FIG. 4 based on the above-described structure, the plurality of resistances RU1–RU6 installed within the first resistance string part 150 are selectively shorted, thus numerous trip points can be obtained without extending the number of decrease resistance branches.

Figure 5:
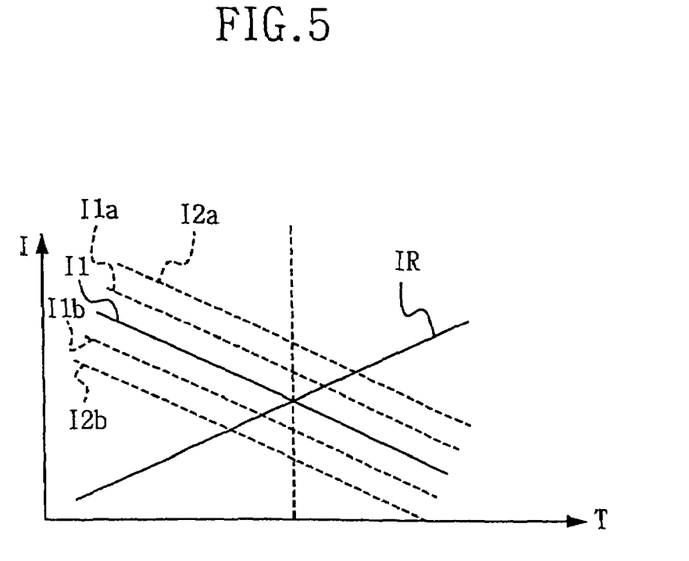
FIG. 5 is a graph illustrating a temperature to current change in generating numerous trip points by an operation of the temperature sensor shown in FIG. 4.
Figure 6:
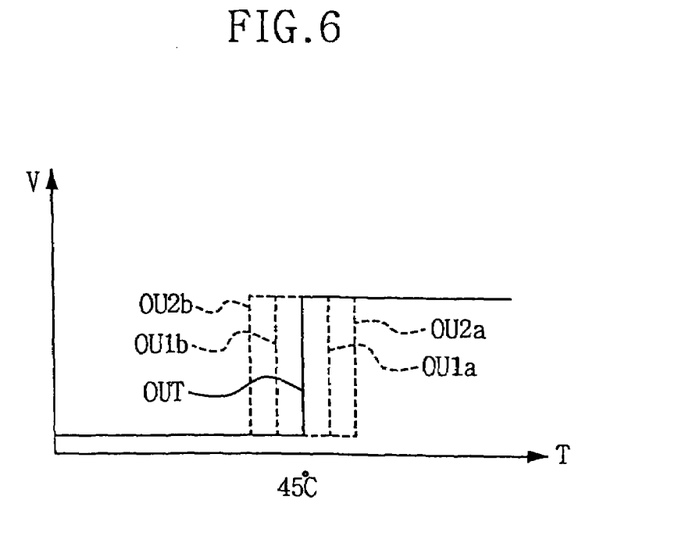
FIG. 6 illustrates an output change of a comparator through the operation of the circuit of FIG. 4.

FIG. 5 is a graph illustrating a temperature to current change in generating numerous trip points by an operation of the temperature sensor shown in FIG. 4. A horizontal axis of the graph shown in FIG. 5 indicates a temperature T and a vertical axis indicates a current I. Further, FIG. 6 illustrates an output change of the comparator OP1 through the operation of FIG. 4. The horizontal axis of FIG. 4 indicates a temperature T, and the vertical axis designates a voltage V.

In the case that a total resistance value of all of the plurality of resistances RU1–RU6 installed in the first resistance string part 150 of FIG. 4, together with the resistance of R1, is determined to be equal to the resistance value of the resistance R1 shown in FIG. 1, and the N-type MOS transistors TR0–TR5 are all turned off, then the current flowing in the branch C of the temperature sensor is provided as the graph I1 of FIG. 5 and an output of the comparator OP1 is provided as a waveform OUT of FIG. 6.

When the sampling signal PTU0 is applied in a high state, the N-type MOS transistor TR0 is turned on and the resistance RU1 is shorted operationally. Thus, the composite resistance value of the branch C is reduced by a resistance value of the resistance RU1. The current flowing in the branch C of the temperature sensor therefore increases as shown in I1a of the graph shown in FIG. 5, and the output of the comparator OP1 is provided as the waveform OU1a of FIG. 6.

When the sampling signal PTU1 is applied as a high state, the N-type MOS transistor TR1 is turned on and the resistance RU2 is shorted operationally. Thus, the composite resistance value of the branch C is reduced by a resistance value of the resistance RU2. The current flowing in the branch C of the temperature sensor therefore increases as shown in I2a of the graph shown in FIG. 5, and the output of the comparator OP1 is provided as the waveform OU2a of FIG. 6.

As described above, numerous trip points can be determined by shorting the resistances through use of one decrease resistance branch. In the meantime, though the example embodiments for the graphs I1b, I2b of FIG. 5 and the waveforms OU1b, OU2b of FIG. 6 are not shown in the drawings, they can be obtained by additionally connecting a second resistance string part 150, and a second short-circuit switching part 160, to the resistance node N02 of FIG. 4. In this case, if the transistors within the second short-circuit switching part 160 are normally turned on, then a transistor is turned-off, a resistance in the second resistance string part 150 is "short-released." Thus, the composite resistance of the branch C increases to reduce a current flowing in the branch C.

Figure 7:
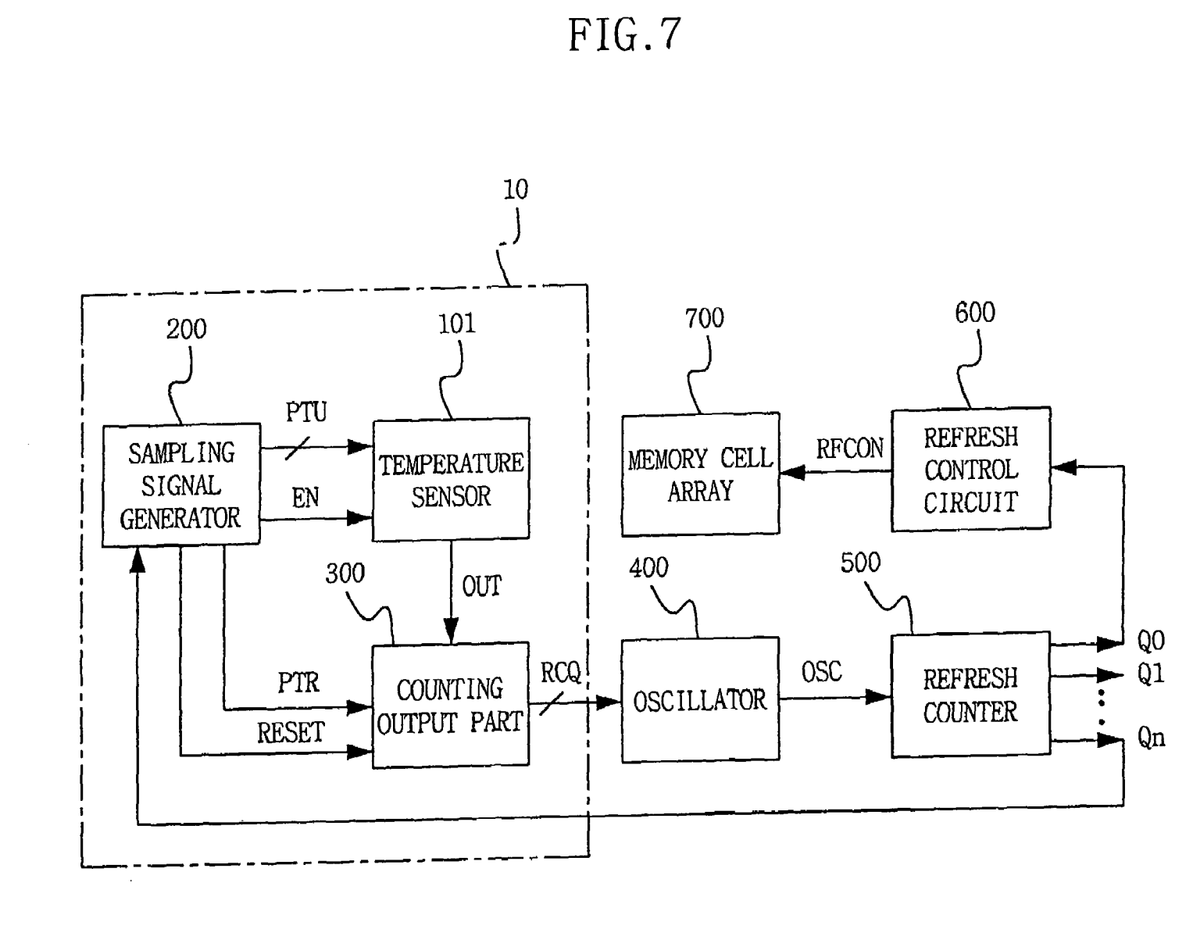
FIG. 7 is a block diagram showing an example of employing a temperature sensing circuit in a semiconductor memory device according to one or more aspects of the present invention.

FIG. 7 shows a block diagram of a semiconductor memory device. The semiconductor memory device of FIG. 7 includes a temperature sensing circuit 10. The temperature sensing circuit 10 may be embodied through an example embodiment by using the temperature sensor of FIG. 4 having numerous temperature trip points in one resistance branch. In applying the temperature sensing circuit 10 of FIG. 7 to a semiconductor memory device such as a DRAM etc., a fine control of the refresh cycle can be performed.

FIG. 7 illustrates an example in employing the inventive temperature sensing circuit to the semiconductor memory device. Referring to FIG. 7, the temperature sensing circuit 10 is mounted on a semiconductor integrated circuit chip and functions as an on-chip thermometer. For convenience, FIG. 7 schematically illustrates only blocks concerning a refresh of the semiconductor memory device.

In FIG. 7, the temperature sensing circuit 10 includes a sampling signal generator 200 for generating a reset signal RESET and sampling signals PTUi, a temperature sensor 101 having a current mirror type differential amplifier connected to the decrease resistance branch in which a current is reduced when the temperature increases, the temperature sensor being for outputting as temperature sensing data OUT a temperature output generated in response to the sampling signals, and a counting output part 300 for counting and latching the temperature sensing data OUT outputted from the temperature sensor 101, and for outputting counting data RCQ, the counting output part 300 being reset by the reset signal of the sampling signal generator.

The temperature sensor 101 within the temperature sensing circuit 10 is installed in the neighborhood of a memory cell array 700.

An oscillator 400 outputs an oscillation signal OSC controlled for an oscillating period in response to the counting data RCQ. A refresh counter 500 outputs refresh counting data in response to the oscillation signal OSC. A refresh control circuit 600 receives the refresh counting data and outputs a refresh control signal RFCON. A word line of a memory cell is enabled by the refresh control signal RFCON to obtain a refresh operation. That is, the refresh control circuit 600 is controlled such that a refresh operation cycle is lengthened when the temperature decreases, and is shortened when the temperature increases depending upon an output of the refresh counter 500 for counting the oscillation signal OSC of the oscillator 400.

Figure 8:
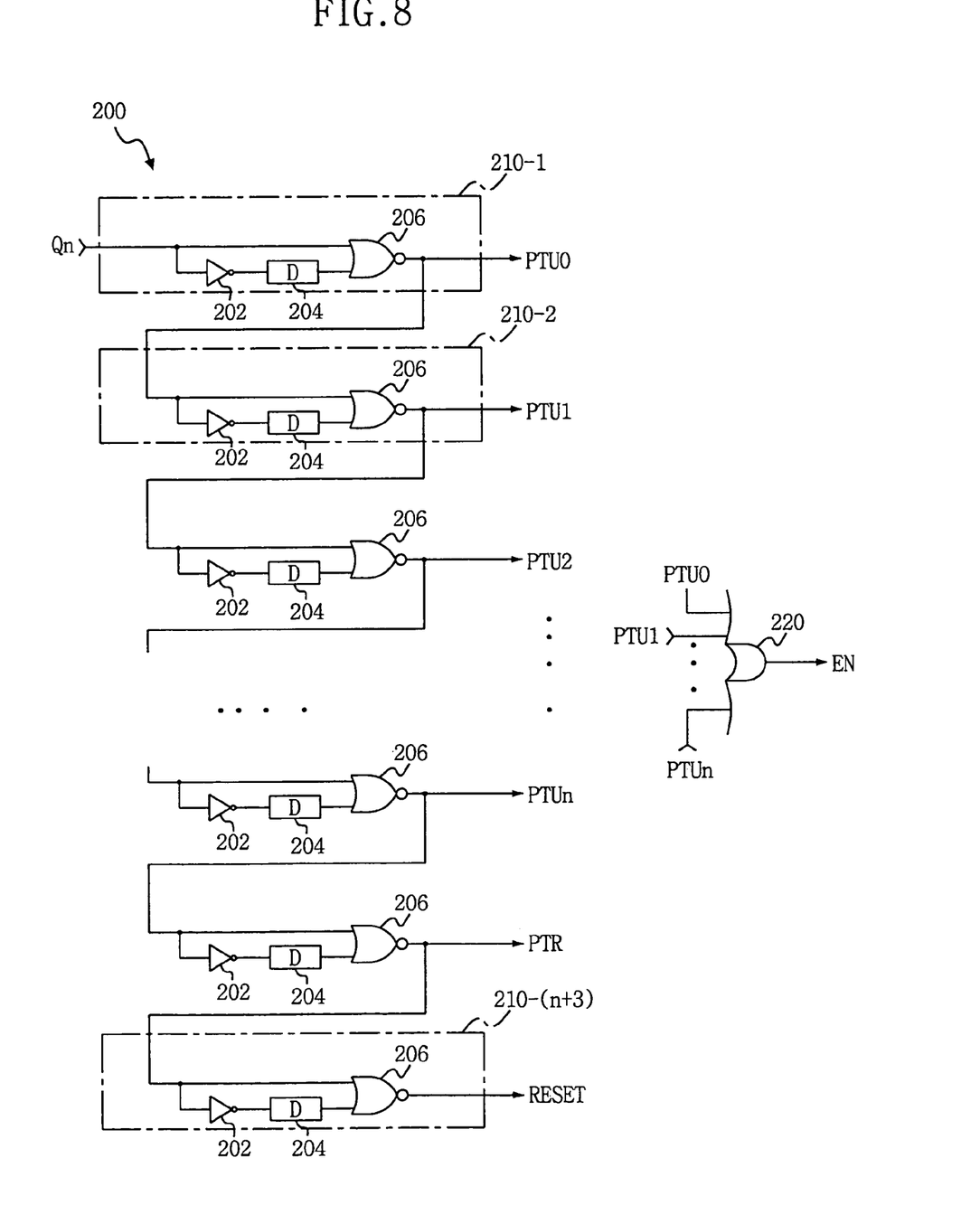
FIG. 8 is a circuit diagram showing in detail an example embodiment of a sampling signal generator shown in FIG. 7.

FIG. 8 is a circuit diagram for an example embodiment of the sampling signal generator 200 shown in FIG. 7. With reference to FIG. 8, the sampling signal generator 200 includes a plurality of unit sampling signal generating parts 210-1, 210-2, . . . , 210-(n+3) and an OR gate 220. A unit sampling signal generating part 210-1 includes an inverter 202 for inverting an applied input signal Qn, a delay 204 for delaying an output of the inverter 202 for a determined time, and a NOR gate 206 for performing a NOR operation on the input signal Qn an output of the delay 204, and generating a sampling signal PTU0. The plurality of unit sampling signal generating parts 210-1, 210-2, . . . , 210-n have a cascade connected structure. A first sampling signal PTU0 is outputted from the first unit sampling signal generating part 210-1, a second sampling signal PTU1 is outputted from the second unit sampling signal generating part 210-2, a reset signal RESET is generated from the last unit sampling signal generating part 210-(n+3), and a pass gate control signal PTR is generated from the next-to-last unit sampling signal generating part.

Meanwhile, the OR gate 220 performs an OR operation for the first through (n+1)th sampling signals PTU0–PTUn, and outputs a comparator enable signal EN.

Figure 9:
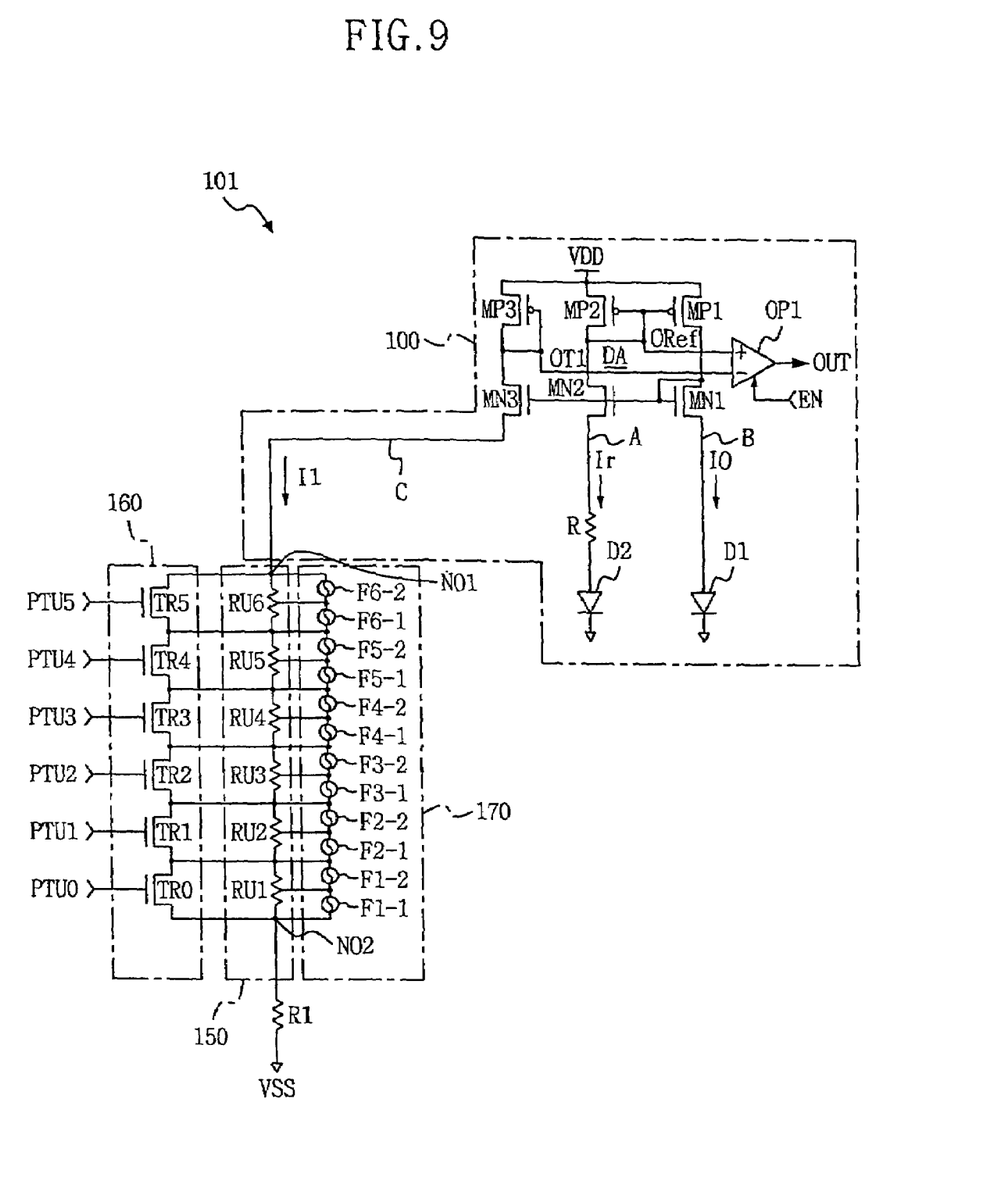
FIG. 9 is a circuit diagram showing in detail an example embodiment of a temperature sensor shown in FIG. 7.

FIG. 9 is a circuit diagram for an example embodiment of the temperature sensor 101 shown in FIG. 7. This temperature sensor has the same configuration to the temperature sensor shown in FIG. 4, except for a resistance value trimming part 170 and the comparator OP1. In FIG. 9, the resistance value trimming part 170 individually varies resistance values for respective resistances RU1–RU6 of the first resistance string part 150, and is composed of fuses F1-1, F1-2, F2-1, F2-2, . . . , F6-2 which are made of polysilicon material and which may be cut by a light source, such as a laser beam, etc. The resistance value trimming part 170 is installed for the following reasons. Since the composite resistance value of the decrease resistance branch C may deviate from a determined value, even though a temperature tuning operation for matching a trip point to a designed temperature point is performed, it is desirable to perform a trimming operation on the resistance values of resistances of the branch C.

Meanwhile, the comparator OP1 has an enable terminal, in contrast to the comparator of FIG. 4. Thus, when the enable signal is applied in a high state, a comparison operation is performed, and when the enable signal is applied in a low state, a level of the output signal OUT always becomes low.

Figure 10:
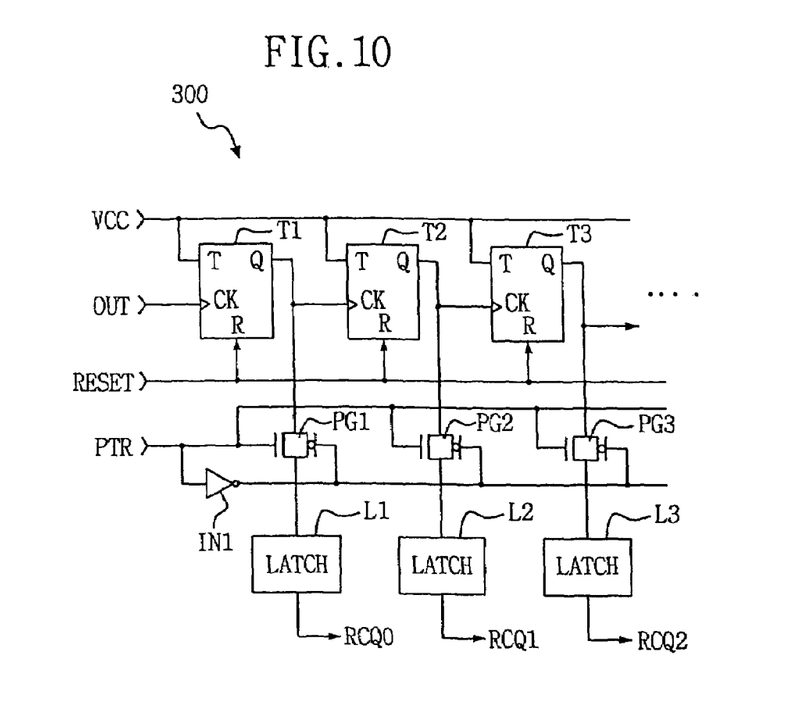
FIG. 10 is a circuit diagram illustrating in detail a counting output part shown in FIG. 7.

FIG. 10 is a circuit diagram for an example embodiment of a counting output part 300 shown in FIG. 7. The counting output part 300 includes a flip-flop circuit part constructed of a plurality of flip-flops T1–T3, in which the temperature sensing data OUT is received through a clock terminal CK of a first-stage flip-flop global search-and-replace T1, and in which an output is connected with the clock terminal of a subsequent flip-flop, and an input terminal T is fixed to a determined logic level VCC. The counting part 300 also includes a pass gate PG1–PG3 for transmitting outputs Q of the plurality of flipflops T1–T3 in response to the pass gate control signal PTR, and a latch L1–L3 for latching the outputs of the plurality of flipflops T1–T3 transmitted from the pass gate PG1–PG3.

Figure 11:
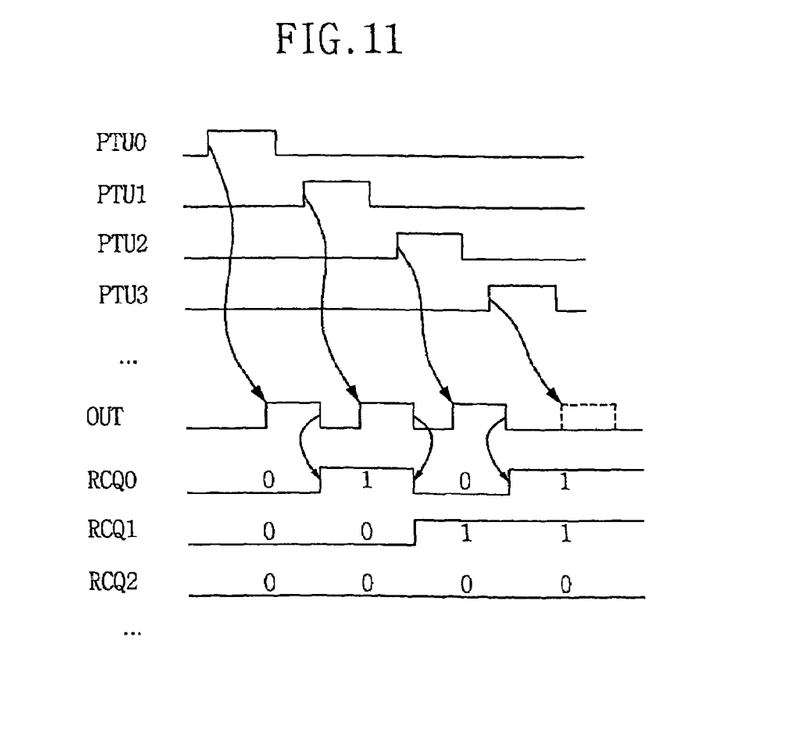
FIG. 11 is an operating timing diagram of the temperature sensing circuit shown in FIG. 7.

FIG. 11 is a timing diagram for operations of the temperature sensing circuit referred to FIG. 7. In FIG. 11, waveforms PTU0–PTU3 correspond to the first through fourth sampling signals, the waveform OUT corresponds to the temperature sensing data of the comparator OP1, and the waveforms RCQ0–RCQ2 correspond to the counting data of the counting output part 300.

Figure 12:
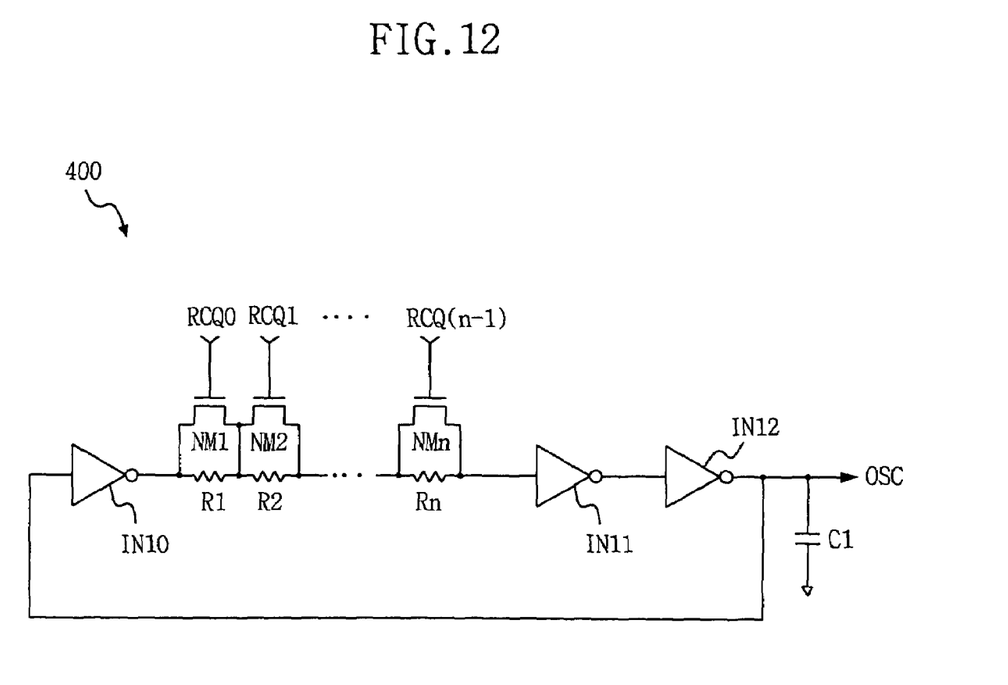
FIGS. 12 and 13 are circuit diagrams illustrating in detail example embodiments of an oscillator shown in FIG. 7.
Figure 13:
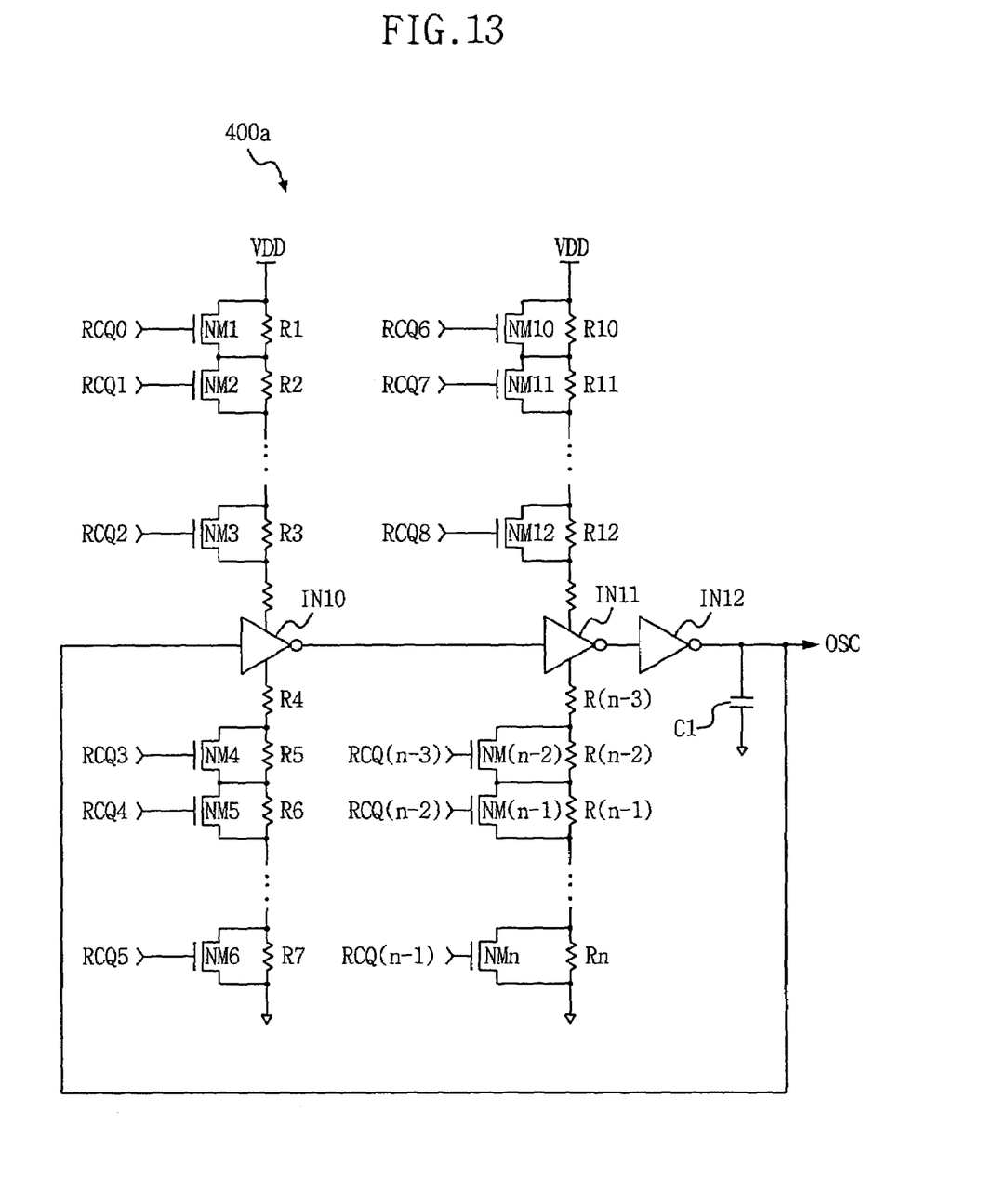

FIGS. 12 and 13 illustrate example embodiments of the oscillator shown in FIG. 7. In FIG. 12, the oscillator 400 includes an inverter chain constructed of an odd number of inverter stages IN10, IN11, IN12, a capacitor C1 connected between an output terminal of the inverter chain and ground, a plurality of resistances R1–Rn cascade-connected between the inverters IN10, IN11, and switching transistors NM1–NMn connected in parallel with the resistances R1–Rn, the switching transistors NM1–NMn being adapted to selectively short the resistances R1–Rn in response to the counting data RCQ0–RCQ(n−1). Meanwhile, in FIG. 13, the resistors R1–Rn are connected between the supply and ground voltages, VDD and ground, and the inverters IN10, IN11.

Figure 14:
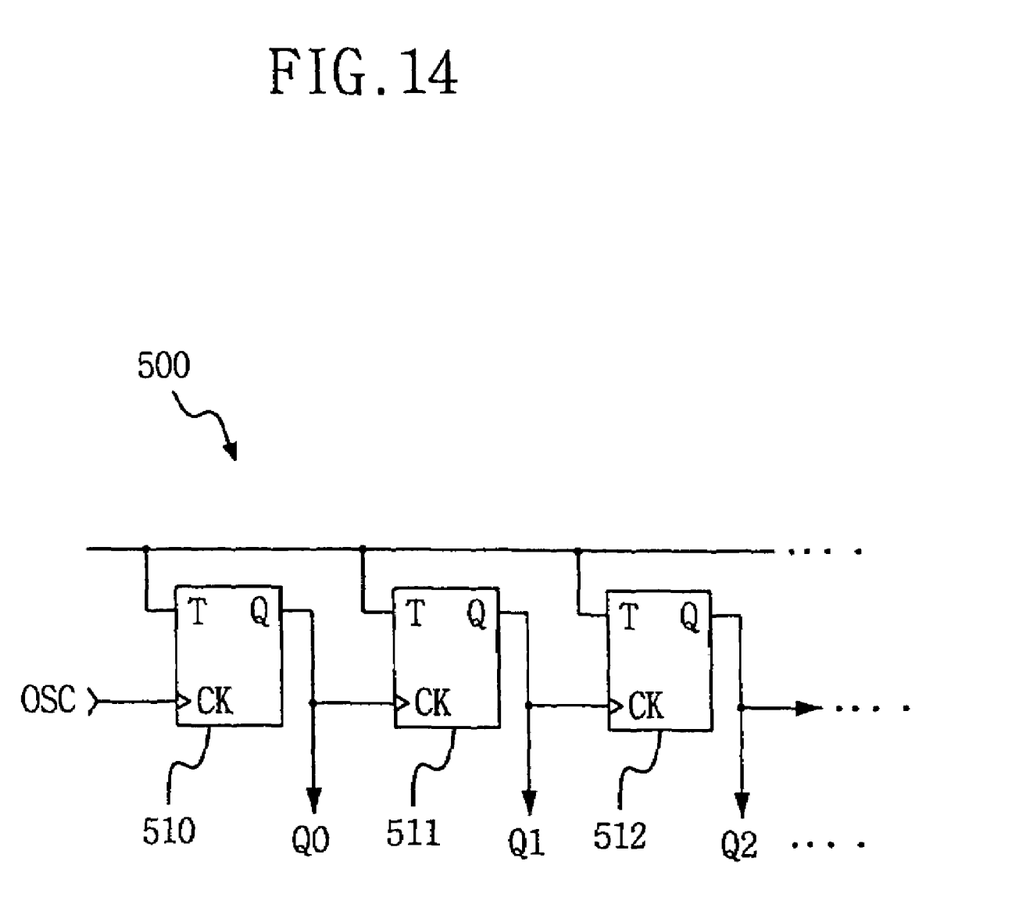
FIG. 14 is a circuit diagram illustrating in detail an example embodiment of a refresh counter shown in FIG. 7.

FIG. 14 is a circuit diagram illustrating in detail an example embodiment of the refresh counter 500 shown in FIG. 7. The refresh counter 500 includes a plurality of flipflops 510–512 in which the oscillation signal OSC of the oscillator is received through the clock terminal of the flipflop 510 provided in the first stage, and in which outputs Q are connected with a clock terminal CK and an input terminal T is fixed to a determined logic level.

An exemplary operation of the temperature sensing circuit will be described as follows.

Referring back to FIG. 7, the temperature sensor 101 is a thermometer having numerous trip points without extending the number of decrease resistance branches, having the configuration shown in FIG. 9. Assuming that there are six upper trip points and six lower trip points on the basis of a determined reference trip point, a refresh cycle of a semiconductor memory device can be increased and decreased, respectively, by six steps according to the temperature. Thus, rapid change of the refresh cycle above and below a sensing temperature point can be avoided and a fine control of the refresh cycle can be performed.

That is, the refresh cycle can be appropriately controlled in conformity with a change of temperature in employing the temperature sensing circuit to the semiconductor memory device, thus self-refresh electrical power can be reduced substantially in conformity with the change of temperature and a refresh reliability in the semiconductor memory device can be guaranteed.

The temperature sensor 101 of FIG. 7 can be employed in other electronic circuits, such as a DC voltage generator, a signal delay path, etc., that require a fine control based on temperature.

It is assumed that the resistances RU1–RU6 of FIG. 9 are determined to individually change trip points in increments of 2° C., that the temperature sensor 101 of FIG. 9 is initially set as 45° C., and an ambient temperature of the memory cell array 700 is 51° C.

First, the first sampling signal PTU0 of the sampling signal generator 200 is applied in a high state, the OR gate 220 of FIG. 8 outputs the comparator enable signal EN in a high state. When the N-type MOS transistor TR0 of FIG. 9 is turned on in response to the first sampling signal PTU0, the resistance RU1 is shorted optionally, to reduce the composite resistance value of the branch C. Thus, the trip point of the temperature sensor 101 shown in FIG. 9 is increased by 2° C. and becomes 45° C.+2° C.=47° C. At this time, the comparator OP1 performs a comparison operation in response to the enable signal EN to output the temperature sensing data OUT having a high state. When the first sampling signal PTU0 is applied from high to low, the comparator enable signal EN becomes low and an output of the comparator OP1 is reset from high to low. FIG. 11 illustrates a timing relationship based on this operation.

Then, when the second sampling signal PTU1 of the sampling signal generator 200 is applied in a high state, the OR gate 220 outputs the comparator enable signal EN as a high state, and the N-type MOS transistor TR1 of FIG. 9 is turned on. Hence, the resistance RU2 is shorted optionally and the composite resistance value of the branch C is reduced substantially more than the previous case. Thus, the trip point of the temperature sensor 101 referred to FIG. 9 is increased by 2° C. and becomes 47° C.+2° C.=49° C. At this time, since an ambient temperature is 51° C., the comparator OP1 still outputs the temperature sensing data OUT having the high state. When the second sampling signal PTU1 is changed from high to low, the comparator enable signal EN becomes low and the output of the comparator OP1 is again reset from high to low. This operation is indicated as an arrow drawn between the waveform PTU1 and the waveform OUT in FIG. 11.

As the above-described operation, when the third sampling signal PTU2 is applied in a high state, the trip point is changed to 51° C. At this time, since the ambient temperature is 51° C., the comparator OP1 outputs the temperature sensing data OUT that vibrates between high and low. When the third sampling signal PTU2 is changed from high to low, the comparator enable signal EN becomes low and the output of the comparator OP1 is reset low.

The counting output part 300 is configured as shown in FIG. 10 and outputs corresponding waveforms of FIG. 11. The waveform RCQ0 is changed to a high state in response to a falling edge of the temperature sensing data OUT and is changed to a low state in response to the next falling edge. Thus, outputs of the latches L2, L3 are provided as the waveforms RCQ1,RCQ2 of FIG. 11.

The oscillator 400 has the switching transistors NM1–NMn for selectively shorting the resistances R1–Rn of FIG. 12 in response to the counting data RCQ0–RCQn of the counting output part 300 shown in FIG. 7, thus the oscillator 400 outputs the oscillation signal OSC controlled for an oscillating period, depending upon a logic state of the counting data RCQ0–RCQn. For example, if the counting data RCQ0 is a high state, a corresponding resistance R1 is shorted operationally. When the composite resistance value of the oscillator 400 is reduced, a cycle of the oscillation signal OSC is shortened. This operation is also performed by the circuit shown in FIG. 13.

As described above, the temperature sensor has numerous trip points through the sampling signals, and the switching transistors NM1–NMn are selectively shorted by a logic level of the counting data RCQ0–RCQn so as to provide a fine control of the period of oscillation signal OSC.

The refresh counter 500 is configured as shown in FIG. 14, and outputs refresh counting data Q0–Q2 in response to the oscillation signal OSC, and the refresh control circuit 600 receives the data and outputs the fine-controlled refresh control signal RFCON in conformity with the temperature. Thereby, a refresh operating cycle is increased by a decrease in temperature, and is lengthened by an increase in temperature.

Though the above description gives an example where the trip point is increased; in case the resistances are further connected similarly and an output of the counting output part 300 is used, it goes without saying that the trip point can be decreased from a reference trip point.

Further, a temperature interval can be finely controlled, using a step that is less than 1° C. or a step that is more than 3° C.

Though the example embodiment of the invention employs the counting output part 300, a binary search method employing a binary successive approximation method can be used. In this case, resistance values of resistances within the first and second resistance string parts are controlled so that a trip point increases or decreases by units of 2, 4, 8, 16, 32 degrees.

As was described above, a temperature range is divided into numerous temperature regions, then, the nearer to a low temperature region, the longer the refresh operating cycle is, and the nearer to a high temperature region, the shorter the refresh operating cycle is. Accordingly, reliability for a semiconductor memory device is guaranteed and the electric power consumed in the refresh operation is saved.

According to the example embodiments described above, there is an advantage that a required control can be performed precisely in conformity with a temperature change since a temperature sensor can have numerous trip points without an extension in the number of decrease resistance branches.

It will be apparent to those skilled in the art that modifications and variations can be made in the present invention without deviating from the spirit or scope of the invention. Thus, it is intended that the present invention cover any such modifications and variations of this invention provided they come within the scope of the appended claims and their equivalents. For example, a detailed configuration of temperature sensor and temperature sensing circuit, or a control method of refresh cycle, can be changed diversely. Accordingly, these and other changes and modifications are seen to be within the true spirit and scope of the invention as defined by the appended claims.

What is claimed is:

1. A temperature sensing circuit, comprising:
a sampling signal generator adapted to generate a reset signal and sampling signals;
a temperature sensor, comprising,
a decrease resistance branch in which current decreases in response to an increase in temperature, and
a current mirror differential amplifier connected to the decrease resistance branch,
wherein said temperature sensor is adapted to output temperature sensing data generated in response to the sampling signals; and
a counting output part adapted to count and latch the temperature sensing data from the temperature sensor, and adapted to output counting data, said counting output part being reset by the reset signal of the sampling signal generator.

2. The circuit as claimed in 1, wherein the temperature sensor further comprises a band-gap reference circuit connected to the differential amplifier.

3. The circuit as claimed in 1, wherein the differential amplifier includes an increase resistance terminal and a decrease resistance terminal, and wherein the temperature sensor further comprises:
an increase resistance branch, which is connected between the increase resistance terminal of the differential amplifier and a lower supply voltage, in which current increases in response to an increase in temperature;
a first resistance string having a plurality of resistances connected in series with the decrease resistance branch, between the decrease resistance terminal and the lower supply voltage;
a short-circuit switching part adapted to selectively short-out one or more of the plurality of resistances in response to the sampling signals; and
a comparator adapted to compare a reference temperature output appearing at the increase resistance with a sensing temperature output appearing at the decrease resistance terminal, and outputting the comparison result as the temperature sensing data.

4. The circuit as claimed in 3, further comprising a resistance value trimming part connected to the first resistance string and adapted to individually vary resistance values for respective resistances of the first resistance string part.

5. The circuit as claimed in 4, wherein the resistance value trimming part comprises a plurality of fuse elements.

6. The circuit as claimed in 3, wherein the temperature sensor comprises:
a second resistance string having a plurality of resistances connected in series with the decrease resistance branch, between the decrease resistance terminal and the lower supply voltage; and a short-circuit release switching part adapted to selectively disconnect a short across one or more of the plurality of resistances of the second resistance string in response to the sampling signals.

7. The circuit as claimed in 1, wherein the sampling signal generator comprises a plurality of unit sampling signal generating parts connected in cascade, each said unit sampling signal generating part being adapted to apply a NOR operation to an applied input signal and an inverted and delayed signal of the input signal, and outputting a result of the NOR operation as a corresponding one of the sampling signals,
wherein a first unit sampling signal generating part outputs a first sampling signal, a second unit sampling signal generating part outputs a second sampling signal, the last unit sampling signal generating part outputs the reset signal, and a unit sampling signal generating part immediately preceding the last unit sampling signal generating part outputs a pass gate control signal.

8. The circuit as claimed in 7, wherein the counting output part comprises:
a plurality of flipflops connected in cascade, each said flipflop having an input terminal, an output terminal, and a clock terminal,
wherein the input terminal of each flipflop is connected to a fixed voltage level,
wherein the temperature sensing data is received at the clock terminal of a first-stage flipflop, and
wherein an output signal appearing at the output terminal of each flip-flop is connected with the clock terminal of a subsequent flipflop;
a pass gate adapted to transmit the output signals of the plurality of flipflops in response to the pass gate control signal; and
a latch adapted to latch the outputs of the plurality of flipflops transmitted by the pass gate.

9. The circuit as claimed in 1, further comprising an oscillator outputting an oscillation signal having an oscillating period controlled in response to the counting data output by the counting output part.

10. The circuit as claimed in 9, further comprising a refresh counter comprising a plurality of flipflops connected in cascade, each said flipflop having an input terminal, an output terminal, and a clock terminal,
wherein the input terminal of each flipflop is connected to a fixed voltage level,
wherein the oscillation signal is received at the clock terminal of a first-stage flipflop, and
wherein an output signal appearing at the output terminal of each flip-flop is connected with the clock terminal of a subsequent flipflop.

11. The circuit as claimed in 9, wherein the oscillator comprises:
an inverter chain having an odd number of inverters;
a capacitor connected between an output terminal of the inverter chain and a lower supply voltage;
a plurality of resistances cascade-connected between inverters of the inverter chain; and
switching transistors connected in parallel across resistances, said switching transistors being adapted to selectively short-out the resistances in response to the counting data.

12. A cycle control circuit of a semiconductor integrated circuit, comprising:
a sampling signal generator adapted to generate first and second control signals;
a temperature sensing circuit adapted to receive the first control signal of the sampling signal generator;
a counter circuit adapted to receive the second control signal and an output of the temperature sensing circuit, and adapted to count and latch the output of the temperature sensing circuit; and
a circuit in which a delay time or level is controlled by output signals of the counter circuit.

13. A temperature sensor, comprising:
a decrease resistance branch having a first current that decreases in response to an increase in temperature, said decrease resistance branch comprising,
a plurality of resistors connected in series, and
means for selectively shorting-out one or more of the plurality of resistors to adjust a total series resistance in the decrease resistance branch;
an increase resistance branch having a second current that increases in response to an increase in temperature;
a current mirror differential amplifier having an increase resistance terminal connected to the increase resistance branch, a decrease resistance terminal connected to the decrease resistance branch, and adapted to output a first voltage representing a reference temperature corresponding to the first current and a second voltage representing a sense temperature corresponding to the second current; and
a comparator adapted to compare the first voltage and the second voltage and to output an output signal having a first logic level when the first voltage is greater than the second voltage, and a second logic level when the first voltage is less than the second voltage.

14. The temperature sensor of claim 13, wherein the means for selectively shorting-out one or more of the plurality of resistors comprises a plurality of switches connected in parallel across resistances, said switches being adapted to selectively short-out the resistances in response to control signals.

15. The temperature sensor of claim 13, wherein the decrease resistance branch further comprises a resistance value trimming part connected across the plurality of resistances and adapted to individually vary resistance values for respective resistances.

16. The temperature sensor of claim 15, wherein the resistance value trimming part comprises a plurality of fuses.

17. The temperature sensor of claim 13, wherein the comparator has an enable input and outputs the output signal at a fixed logic level in response to the enable signal being inactive, regardless of the first and second voltages.

* * * * *